United States Patent
Hatakeyama et al.

(10) Patent No.: US 7,389,938 B2
(45) Date of Patent: Jun. 24, 2008

(54) RADIO COMMUNICATION SYSTEM

(75) Inventors: Shigeru Hatakeyama, Tokyo (JP); Shigeru Yamazaki, Tokyo (JP); Hiroki Murayama, Tokyo (JP); Kouichi Hirano, Tokyo (JP)

(73) Assignee: NEC Corporation, Tokyo (JP)

( * ) Notice: Subject to any disclaimer, the term of this patent is extended or adjusted under 35 U.S.C. 154(b) by 32 days.

(21) Appl. No.: 11/449,777

(22) Filed: Jun. 9, 2006

(65) Prior Publication Data

US 2006/0278706 A1 Dec. 14, 2006

(30) Foreign Application Priority Data

Jun. 10, 2005 (JP) ............................. 2005-171744

(51) Int. Cl.
*G06K 19/05* (2006.01)
(52) U.S. Cl. ....................................... 235/492; 235/439
(58) Field of Classification Search ................. 235/492, 235/472.02, 435, 439, 487; 343/746, 834, 343/833
See application file for complete search history.

(56) References Cited

U.S. PATENT DOCUMENTS

| 6,320,509 B1 * | 11/2001 | Brady et al. ............. 340/572.7 |
| 6,441,740 B1 * | 8/2002 | Brady et al. ............. 340/572.7 |
| 6,680,711 B2 * | 1/2004 | Desargant et al. ..... 343/781 CA |
| 2005/0156806 A1 | 7/2005 | Ohta et al. |
| 2006/0001585 A1 * | 1/2006 | Saito et al. .................. 343/754 |

FOREIGN PATENT DOCUMENTS

| JP | 2003-198422 A | 7/2003 |
| JP | 2003-249872 A | 9/2003 |
| JP | 2003-283365 A | 10/2003 |
| JP | 2003-298465 A | 10/2003 |
| JP | 2004-032067 A | 1/2004 |
| JP | 2005-109603 A | 4/2005 |

* cited by examiner

*Primary Examiner*—Daniel St.Cyr
(74) *Attorney, Agent, or Firm*—Foley & Lardner LLP

(57) ABSTRACT

It is to provide a radio communication system capable of performing highly reliable reading/writing communication even though the RFID tags face in the random directions. The radio communication system comprises an RFID tag used for identification, a reader/writer for performing transmission and reception of information between the RFID tag by radio waves, and a plurality of reflecting plates in a space where a plurality of RFID tags are accumulated. The reflecting plates direct traveling direction of the radio wave irradiated from the reader/writer towards the RFID tags. A part of the radio waves irradiated from an antenna of the reader/writer is directed to travel three-dimensionally towards the space by the effect of the reflecting plates. Moreover, the radio waves traveling in the same direction among the reflected radio waves by the plurality of reflecting plates together allow attenuation caused due to distance to be reduced extremely.

8 Claims, 10 Drawing Sheets

RADIO COMMUNICATION SYSTEM

BACKGROUND OF THE INVENTION

1. Field of the Invention

The present invention relates to a radio communication system that is used in a distribution process of merchandise, for example, for managing the merchandise.

2. Description of the Related Art

In stores such as supermarkets, commodities are arranged on display racks, and different kinds of commodities are stored in a warehouse of the store or in warehouses in the process of distribution. These commodities are not just stored but need to be supplied additionally when the current stocks are consumed. Further, the commodities need to be sent out according to orders. The radio communication system is used for managing those commodities.

The radio communication system disclosed in Japanese Unexamined Patent Publication 2004-32067 utilizes an RFID technique, which is constituted with an RFID (Radio Frequency IDentification) tag comprising an antenna coil, a memory and the like, and a reader/writer module which reads information from the RFID tag and writes information to the RFID tag. The reader/writer module is connected to a host computer that performs information management.

[Patent Literature 1] Japanese Unexamined Patent Publication 2004-32067

[Patent Literature 2] Japanese Unexamined Patent Publication 2005-109603

The RFID tags are attached to the commodities so that the tags can be placed at the same position of the commodities. Commodities are transported to clients through a distribution process, which are temporarily stored in a warehouse. Thus, in the case where the commodities are piled up for storage, it is rare that the RFID tags attached to the commodities are arranged to face the same direction. Rather, the RFID tags normally face the random directions.

Returning to the reader/writer module, a single reader/writer module is used for managing a plurality of RFID tags in actual circumstances for managing the plurality of RFID tags which are attached to the commodities and accumulated in a warehouse or the like, considering the economic phase and efficiency.

The radio communication system of this kind uses a very weak power of radio waves for eliminating disturbances to other apparatuses by the radio waves. Thus, the communicable distance is limited to be within the range of about 30 cm-several m.

The RFID may face the random directions depending on the stored state of the commodities, so that there may be the case where the radio waves irradiated from the reader/writer do not reach to the RFID tags. Therefore, it is not possible to perform highly reliable reading/writing communication.

SUMMARY OF THE INVENTION

The object of the present invention is to provide a radio communication system capable of performing highly reliable reading/writing communication even though RFID tags face the random directions.

In order to achieve the aforementioned object, the radio communication system according to the present invention comprises: a radio IC chip used for identification; a transmitting/receiving device for performing transmission and reception of information between the radio IC chip by a radio wave; and a radio-wave directive unit provided in a space where a plurality of the radio IC chips are accumulated, wherein the radio-wave directive unit directs traveling direction of the radio wave irradiated from the transmitting/receiving device towards the radio IC chips.

With the present invention, the radio IC chips at the position capable of directly receiving the radio waves in the traveling direction of the radio waves from the transmitting/receiving device can directly receive the radio waves from the transmitting/receiving device. Let us assume that there are radio chips that are not capable of directly receiving the radio waves from the transmitting/receiving device due to the storage condition of the commodities.

The present invention comprises a radio-wave directive unit in a space where a plurality of the radio IC chips are accumulated, and traveling direction of the radio waves from the transmitting/receiving device is directed towards the radio IC chips by the radio-wave directive unit. Thus, the radio IC chips receive the radio waves from the transmitting/receiving device via the radio-wave directive unit.

Therefore, highly reliable reading/writing communication can be performed between the transmitting/receiving device and the radio chips regardless of the facing directions of the radio IC chips.

It is desirable that he radio-wave directive unit direct the radio wave from the transmitting/receiving device to travel in three-dimensional directions within the space.

This structure allows the radio waves from the transmitting/receiving device to travel in the three-dimensional directions within the space by the radio-wave directive unit. Thus, the diversity of positions for placing the radio IC chips can be extended.

The radio-wave directive unit may direct the radio wave from the transmitting/receiving device towards the space by reflection. In this case, the radio-wave directive unit is constituted with a plurality of reflecting plates having reflecting surfaces for reflecting the radio wave, and the plurality of reflecting plates are arranged at positions surrounding the space.

Further, the plurality of reflecting plates may be any of: a combination of reflecting plates with the reflecting surfaces formed as planes; a combination of reflecting plates with the reflecting surfaces formed as concave surfaces; or a combination of reflecting plates with the reflecting surfaces formed as convex surfaces. Furthermore, the plurality of reflecting plates may be a combination of reflecting plates having a different reflecting surface from each other.

An RFID tag for identifying an object may be used as the radio IC chip and a reader/writer for managing the RFID tag as the radio IC chip may be used as the transmitting/receiving device for building the radio communication system.

As described above, the present invention comprises the radio-wave directive unit in the space where a plurality of the radio IC chips are accumulated, and traveling direction of the radio waves from the transmitting/receiving device is directed towards the radio IC chips by the radio-wave directive unit. Thus, the radio IC chips receive the radio waves from the transmitting/receiving device via the radio-wave directive unit. As a result, highly reliable reading/writing communication can be performed between the transmitting/receiving device and the radio IC chips regardless of the facing directions of the radio IC chips.

DETAILED DESCRIPTION OF THE PREFERRED EMBODIMENTS

Figure 1:
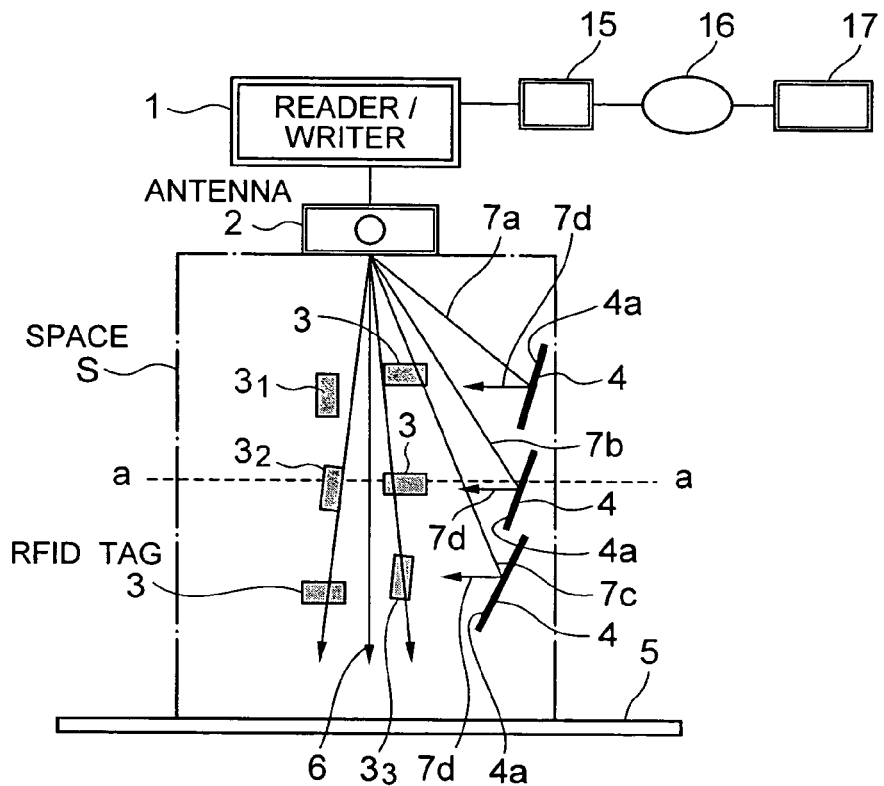
FIG. 1 is a block diagram for showing a radio communication system according to a first embodiment of the present invention.

Embodiments of the present invention will be described hereinafter by referring to the accompanying drawings.

As the fundamental structure, a radio communication system according to the embodiments of the present invention comprises a radio IC chip (3) used for identification and a transmitting/receiving device (1) for performing transmission and reception of information between the radio IC chip (3) by radio waves. In addition, the radio communication system is provided with radio-wave directive units (4, 8, 9, 10) in a space S where a plurality of radio IC chips (3) are accumulated. The radio-wave directive units (4, 8, 9, 10) are to direct the traveling direction of the radio waves from the transmitting/receiving device (1) towards the radio IC chips (3).

Next, the embodiments of the present invention will be described specifically by referring to the case where: a plurality of reflecting plates 4, 8, 9, 10 with reflecting surfaces are used as the radio-wave directive units; an RFID tag 3 for identifying an object is used as the radio IC chip; and a reader/writer for managing the RFID tag 3 is used as the transmitting/receiving device. The RFID tag comprises an antenna coil, a memory and the like. The reader/writer is provided with a function of reading information from the RFID tag and writing information to the RFID tag by the radio waves. Widely-used types are used for the RFID tags and the reader/writer.

First Embodiment

Figure 2:
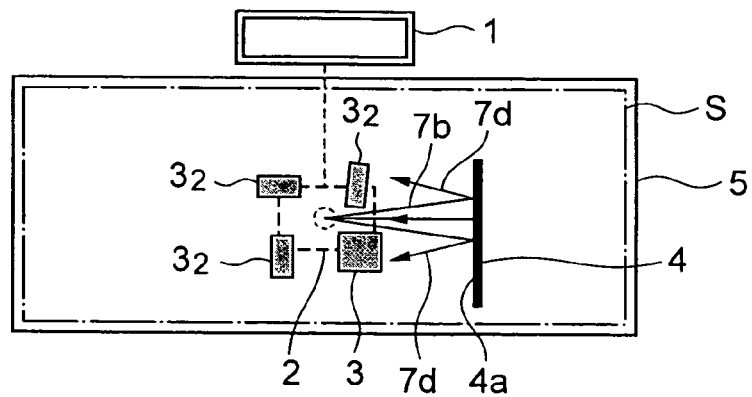
FIG. 2 is a block diagram when viewing an antenna side of a reader/writer from the face taken along the a-a line of FIG. 1.

FIG. 1 and FIG. 2 show a first embodiment of the present invention. As shown in FIG. 1 and FIG. 2, commodities and the like to which the RFID tags 3 are attached are piled up vertically and collected at a depot. Other than the case of a store and a warehouse in the distribution process, the depot may be an aisle of the store or a carrier that passes through a production line. In short, the depot means the space S where a plurality of RFID tags 3 that are attached to the commodities and the like are accumulated. FIG. 1 illustrates only the RFID tags 3 attached to the commodities but the commodities themselves to which the RFID tags 3 are attached.

An antenna 2 of the reader/writer 1 is placed downwards at the upper position of the space S, e.g. at the ceiling of the warehouse, so that a traveling direction 6 of the radio waves is directed towards the space S for allowing the radio waves from the antenna 2 to cover most of the area within the space S. Arrows extended from the antenna 2 of the reader/writer 1 show the radio waves and the irradiated directions thereof.

A computer terminal 15 is connected to the reader/writer 1, and information is exchanged between the reader/writer 1 and the computer terminal 15. Further, the computer terminal 15 is connected to a server 17 through a network 16. Information from the computer terminal 15 is accumulated in the server 17, and the information is outputted from the server 17 to the computer terminal 15 through the network 16.

The reflecting plate 4 as the radio-wave directive unit reflects the radio wave from the reader/writer 1 and directs it towards the inside the space S. The reflecting plate 4 comprises a plane reflecting surface 4a on a flat surface where the radio wave enters, which is formed by metal finishing or applying radio reflector, so as to reflect the radio waves by the reflecting surface 4a.

Now, there will be described the relation between the reader/writer 1 and the RFID tag 3. It is assumed that the radio waves outputted from the antenna 2 of the reader/writer 1 are irradiated with a roughly fan-shape directional characteristic with the traveling direction 6 being the center. In that situation, there may be a case where the antenna of the RFID tag 3 cannot receive the radio waves depending on the positional relation between the radio waves and the antenna of the RFID tag 3.

Specifically, in FIG. 1, the antenna of the RFID tag 3 is in the posture facing properly to receive the radio waves from the reader/writer 1. Thus, it is in the state capable of directly receiving the radio waves from the reader/writer 1. In the meantime, the antennas of the RFID tags $3_1$, $3_2$, $3_3$ are in the posture that is in parallel to the traveling direction 6 of the radio waves from the reader/writer 1 or in the posture that the radio waves are shielded by the RFID tag main body. Thus, the antennas thereof cannot receive the radio waves from the reader/writer 1 in a good condition.

Therefore, in the embodiment of the present invention, the reflecting plates 4 are disposed within the space S. There are the reflecting plates 4 arranged in a plurality of steps in the vertical direction with respect to a floor 5 of the warehouse or the like, which are disposed with the reflecting surface 4a being inclined so that the radio waves from the antenna 2 can make incident thereon. The inclined angles of the reflecting plates 4 are changed in accordance with the incident positions of the radio waves from the antenna 2. In the case of the drawing, the inclined angle of the reflecting plates 4 that reflect radio waves 7a, 7b towards the RFID tags $3_1$, $3_2$ positioned in the upper step and the middle step are set small, whereas the inclined angle of the reflecting plate 4 that reflects radio wave 7c towards the RFID tag $3_3$ positioned in the lower step is set large. The number of the reflecting plates 4 to be placed and the inclined angles herein are examples, and those may be selected as appropriate by collecting statistics on the directions of the antennas of the RFID tags 3 accumulated within the space S, or according to a rule of thumb, etc. The point is that, it needs to be in a configuration where the radio waves from the reader/writer 1 are reachable to the antennas of all the RFID tags 3 accumulated in the space S by using the reflecting plate 4 with the reflecting surface 4a, regardless of the facing directions of the antennas of the RFID tags 3.

Furthermore, by the inclined plane reflecting surface 4a, the reflecting plate 4 reflects the radio waves from the reader/writer 1, which make incident obliquely as shown in FIG. 1, in the parallel direction or the directions slightly shifted above or below thereof and in the lateral direction as shown in FIG. 2 so that reflected radio waves 7d travel three-dimensionally towards the space S.

Further, in the case where the depot is a warehouse surrounded by walls from all directions, for example, the plurality of reflecting plates 4 are disposed to enclose the space S estimated within the warehouse. In the case where the depot is an aisle of a store or a carrier moved on a production line, for example, the reflecting plates 4 are disposed to sandwich the aisle or the production line from both sides. In addition to the arranging relation, the plurality of reflecting plates 4 are disposed to surround the radio waves from the antenna 2 of the reader/writer 1 since the radio waves from the antenna 2 of the reader/writer 1 are irradiated with a directional characteristic which is to spread in roughly fan shape with the radio-wave traveling direction 6 being the center. As the reflecting plates 4, FIG. 1 and FIG. 2 illustrate only a part of the reflecting plates 4 among the reflecting plates 4 surrounding the radio waves irradiated from the antenna 2 of the reader/writer 1.

Next, action of the radio communication system according to the embodiment of the present invention will be described. The RFID tag 3 is attached to the commodity to be identified. The RFID tag 3 carries information necessary to identify the commodity, which is written by using an information writing device (not shown). The RFID tag 3 to which the information is written in this manner is brought into the space S of the depot along with the commodity, so that a plurality of RFID tags 3 are to be accumulated within the space S.

The commodities transported into the space 3 are piled up vertically to be stored within the space S or dispersed within the area of the space S. In the process of transporting and storing the commodities within the space S in this manner, the facing directions of the antennas of the RFID tags 3 are not controlled in an actual circumstance so that the antennas face the random directions.

In the space S where the plurality of RFID tags 3 are accumulated, the radio waves from the antenna 2 of the reader/writer 1 set at the ceiling of the space S are irradiated at the timing of bringing in the commodities, for example. The reader/writer 1 reads the information carried by the RFID tags 3 by the radio waves for managing the commodities.

However, as described above, the antennas of the RFID tags 3 face the random directions. Thus, it is impossible for the antennas of the RFID tags 3 facing the random directions to receive the radio waves irradiated from the antenna 2 of a single reader/writer 1.

With the embodiment of the present invention, the radio waves from the reader/writer 1 directly reach to the RFID tags 3 which are in the receivable state with respect to the radio waves irradiated from the antenna 2 of the reader/writer 1, and bidirectional communication by the radio waves is carried out through the antennas of the RFID tags 3 and the antenna 2 of the reader/writer 1. Thereby, the information written to the RFID tags 3 is collected by the reader/writer 1 and sent to the computer terminal 15. The computer terminal 15 provides the information obtained from the reader/writer 1 to the server 17 through the network 16. Based on the information provided from the computer terminal 15, the server 17 performs management of the commodities to which the RFID tags 3 are attached. When there is a change in the information for managing the commodity or it becomes necessary to adds new information, the server 17 sends the information thereof to the computer terminal 15 through the network.

Upon receiving the information from the server 17, the computer terminal 15 sends the information to the reader/writer 1. The reader/writer 1 irradiates the received information towards the space S from the antenna 2 by the radio waves. When the corresponding RFID tag 3 directly receives the information from the reader/writer 1 irradiated from the antenna 2, the information is written to a memory of the corresponding RFID tag 3.

When the antennas of the RFID tags 3 are in a state not receivable of the radio waves from the antenna 2 of the reader/writer 1, the radio waves from the reader/writer 1 come in to those RFID tags $3_1$, $3_2$, $3_3$ by the effect of the reflecting plates 4 as shown in FIG. 1 and FIG. 2.

That is, there may be the RFID tags $3_1$, $3_2$, $3_3$ whose antennas face the directions that are unaligned with respect to the radio waves irradiated from the antenna 2 of the reader/writer 1 as shown in FIG. 1 and FIG. 2.

Figure 15:
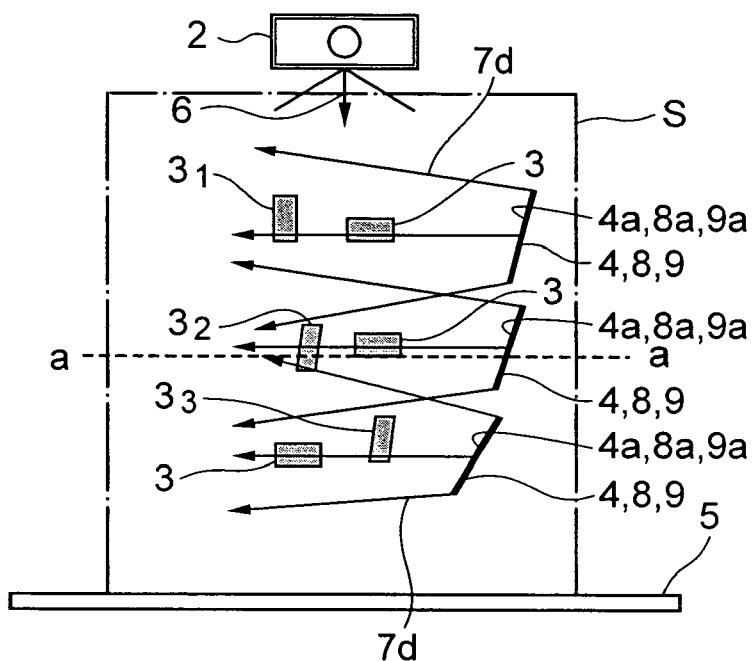
FIG. 15 is an illustration for showing a reflected-wave characteristic according to the embodiment of the present invention.

As shown in FIG. 1, the plurality of reflecting plates 4 are disposed with the reflecting surfaces 4a inclined obliquely so that the radio waves make incident thereon, and the inclined angles of the reflecting plates 4 are changed in accordance with the position on which the radio wave from the antenna 2 makes incident. Thus, as shown in FIG. 1 and FIG. 15, when viewed from the side-face (vertical direction) side of the reflecting plates 4 while the reflecting plates 4 are being disposed, in each of the reflecting plates 4 arranged in a plurality of steps in the vertical direction, the radio waves 7a, 7b, 7c, 7d spread from the radio-wave traveling direction 6 among the radio waves irradiated from the antenna 2 of the reader/writer 1 make incident on the reflecting surfaces 4a of the reflecting plates 4, which are reflected three-dimensionally in the obliquely upper direction or the obliquely lower direction, and in the horizontal direction or the direction slightly shifted therefrom.

Figure 16:
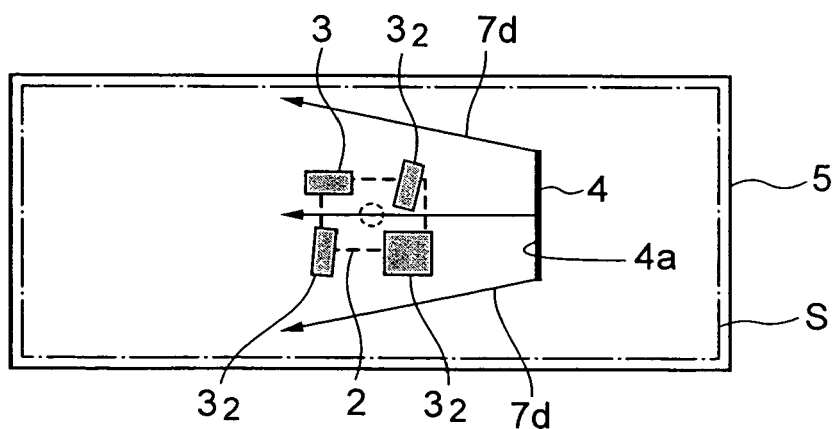
FIG. 16 is an illustration for showing a reflected-wave characteristic according to the embodiment of the present invention.

Furthermore, as shown in FIG. 2 and FIG. 16, when viewed from the above (in the lateral direction) while the reflecting plate 4 is being disposed, the radio waves from the reader/writer 1 are reflected by the reflecting plate 4 to disperse in the lateral direction.

As described above, a part of the radio waves irradiated from the antenna 2 of the reader/writer 1 is directed three-dimensionally towards the space S by the effect of the reflecting plates 4. In addition, the radio waves directed in the same direction among the reflected radio waves by the plurality of reflecting plates 4 together allow attenuation caused due to distance to be reduced extremely.

The radio waves 7a, 7b irradiated from the reader/writer 1 as shown in FIG. 1 are reflected by the reflecting plates 4 with small inclined angles placed in the upper and middle steps, and directed to travel towards the RFID tags $3_1$, $3_2$ positioned in the upper and middle steps. Therefore, it enables the radio waves from the reader/writer 1 to reach surely to the RFID tags $3_1$, $3_2$ which face unaligned directions with respect to the radio waves from the reader/writer 1.

Further, the radio wave 7c irradiated from the reader/writer 1 as shown in FIG. 1 is reflected by the reflecting plate 4 with a large inclined angle disposed in the lower step, and directed to travel towards the RFID tags $3_3$ positioned in the lower step. Therefore, it enables the radio waves from the reader/writer 1 to reach surely to the RFID tags $3_3$ which face unaligned direction with respect to the radio waves from the reader/writer 1.

In addition to the fact that the radio waves from the reader/writer 1 are dispersed in the lateral direction by the reflecting surface 4a of the reflecting plate 4 as shown in FIG. 2, the reflection of the reflecting plates 4 as described above allow the radio waves from the reader/writer 1 to reach to the antennas of all the RFID tags 3 accumulated in the space S, regardless of the facing directions of the RFID tags 3 positioned within the space S.

Second Embodiment

Figure 3:
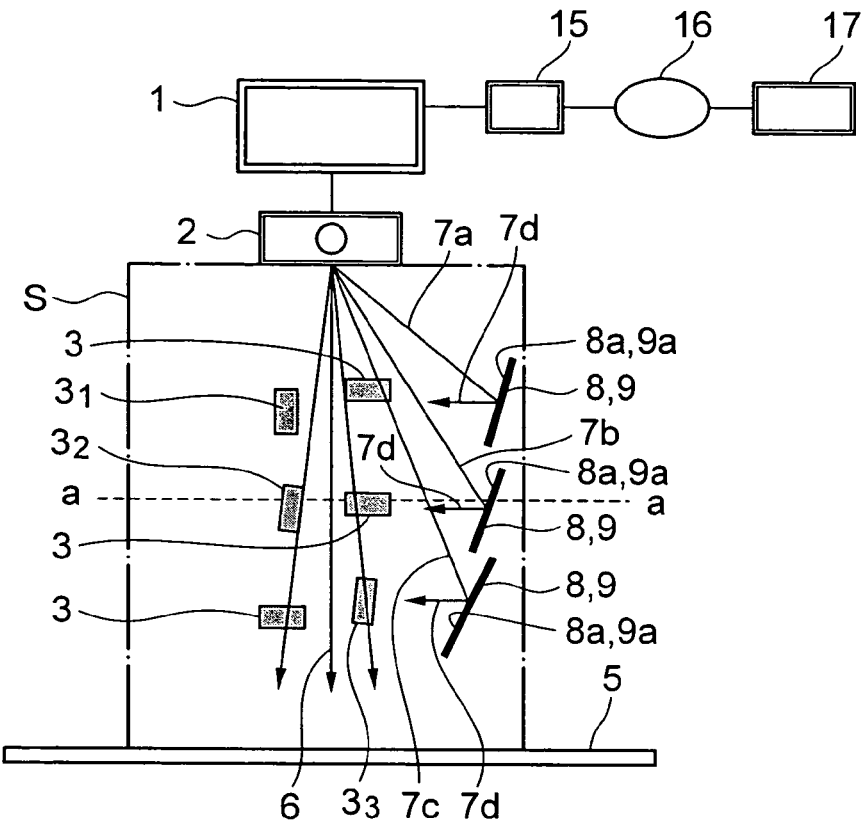
FIG. 3 is a block diagram for showing a radio communication system according to a second embodiment of the present invention.
Figure 4:
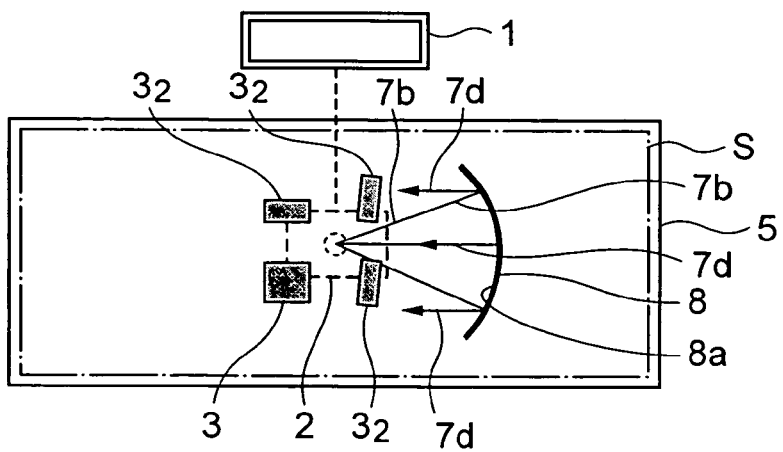
FIG. 4 is a block diagram when viewing an antenna side of a reader/writer from the face taken along the a-a line of FIG. 3.

FIG. 3 and FIG. 4 show a second embodiment of the present invention. In the second embodiment of the present invention illustrated in FIG. 3 and FIG. 4, the reflecting surface 4a of the reflecting plate 4 shown in FIG. 1 is modified to a concave-shape reflecting surface.

A reflecting plate 8 according to the second embodiment of the present invention is formed in the following manner when viewed from the side-face side of the reflecting plate 8 while the reflecting plate 8 is being disposed as shown in FIG. 3. That is, a reflecting surface 8a along the traveling direction 6 of the radio waves from the antenna 2 of the reader/writer 1, i.e. the vertical direction (longitudinal direction) of the reflecting plate, is formed linearly (in a plane shape as a whole). Further, when viewed from the above in the state where the reflecting plate 8 is disposed as shown in FIG. 4, the cross section of the reflecting surface 8a of the reflecting plate 8 along the length direction (lateral direction) is curved in an arc form. The reflecting surface 8a curved in an arc form is formed as a concave-shape secondary parabolic cylindrical surface. Furthermore, the reflecting plate 8 is arranged in such a posture that the focal point position of the concave-shape reflecting surface 8a coincides with the center of the traveling direction 6 of the radio wave from the antenna 2 of the reader/writer 1. The arranging configuration of the reflecting plates 8 is the same as that of the first embodiment.

As shown in FIG. 3, a plurality of reflecting plates 8 are disposed with the reflecting surfaces 8a inclined obliquely so that the radio waves make incident thereon, and the inclined angles of the reflecting plates 8 are changed in accordance with the position on which the radio wave from the antenna 2 makes incident. Thus, as shown in FIG. 3 and FIG. 15, when viewed from the side-face (vertical direction) side of the reflecting plates 8 while the reflecting plates 8 are being disposed, in each of the reflecting plates 8 arranged in a plurality of steps in the vertical direction, the radio waves spread from the radio-wave traveling direction 6 among the radio waves irradiated from the antenna 2 of the reader/writer 1 make incident on the reflecting surfaces 8a of the reflecting plates 8, which are reflected to be dispersed in the obliquely upper direction or the obliquely lower direction, and in the horizontal direction.

Figure 17:
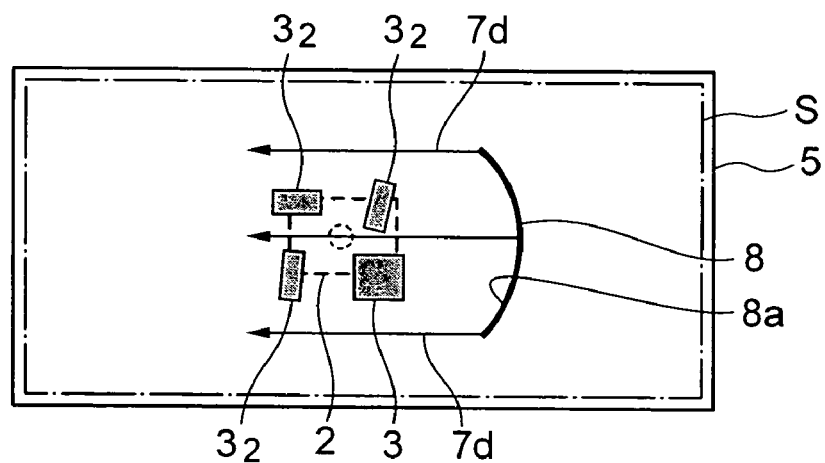
FIG. 17 is an illustration for showing a reflected-wave characteristic according to the embodiment of the present invention.

Furthermore, as shown in FIG. 4 and FIG. 17, when viewed from the above the reflecting plate 8 while the reflecting plate 8 is being disposed, the radio waves from the reader/writer 1 are reflected by the reflecting plate 8 to the parallel direction.

As described above, a part of the radio waves irradiated from the antenna 2 of the reader/writer 1 is directed to travel three-dimensionally towards the space S by the effect of the reflecting plate 8. In addition, the reflected radio waves by the plurality of reflecting plates 8 travel in the parallel state. Thus, the electric powers of the radio waves become uniform regardless of the distances from the reflecting plates 8 except for the spread in the upper and lower directions. Therefore, compared to the first embodiment, the second embodiment is capable of performing reading/writing communication between the RFID tags 3 piled up three-dimensionally and the reader/writer 1 by using almost uniform power regardless of the distances.

Third Embodiment

Figure 5:
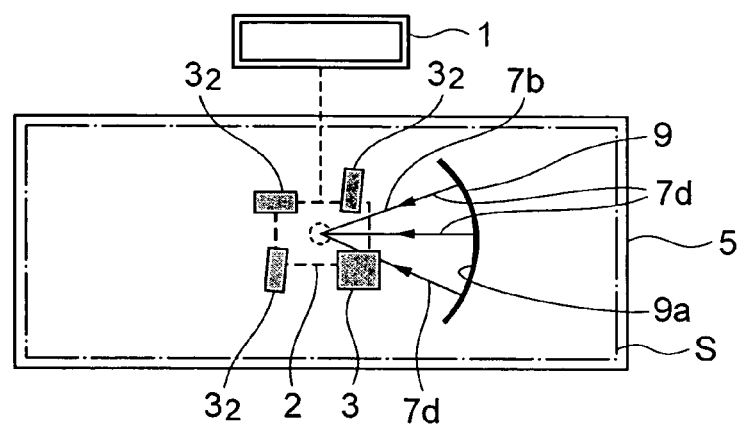
FIG. 5 is a block diagram for showing a radio communication system according to a third embodiment, when viewing an antenna side of a reader/writer from the face taken along the a-a line of FIG. 3.

FIG. 5 shows a third embodiment of the present invention. In the third embodiment of the present invention illustrated in FIG. 5, the reflecting surface 8a of the reflecting plate 8 shown in FIG. 2, which is in the secondary parabolic cylindrical surface, is modified to a cylindrical surface that is a kind of concave shapes.

As shown in FIG. 5, when a reflecting plate 9 according to the third embodiment of the present invention is viewed from the above while it is being placed, the cross section thereof along the length direction (lateral direction) is formed in a concave cylindrical face form. In this case, in the state where the reflecting plate 9 is disposed, the cross sectional shape of a reflecting surface 9a along the traveling direction 6 of the radio wave irradiated from the antenna 2 of the reader/writer 1, i.e. the vertical direction of the reflecting pate 9, is in a linear form (plane shape as a whole) as in the second embodiment. Further, the reflecting plate 9 is arranged in such a posture that the focal point position of the concave cylindrical shape reflecting surface 9a coincides with the center of the traveling direction 6 of the radio wave from the antenna 2 of the reader/writer 1. Thus, the radio waves from the reader/writer 1 can be converged towards the traveling direction 6 of the radio waves irradiated from the antenna 2 by the concave cylindrical surface (reflecting surface) 9a. Other structures are the same as those of the second embodiment.

Figure 18:
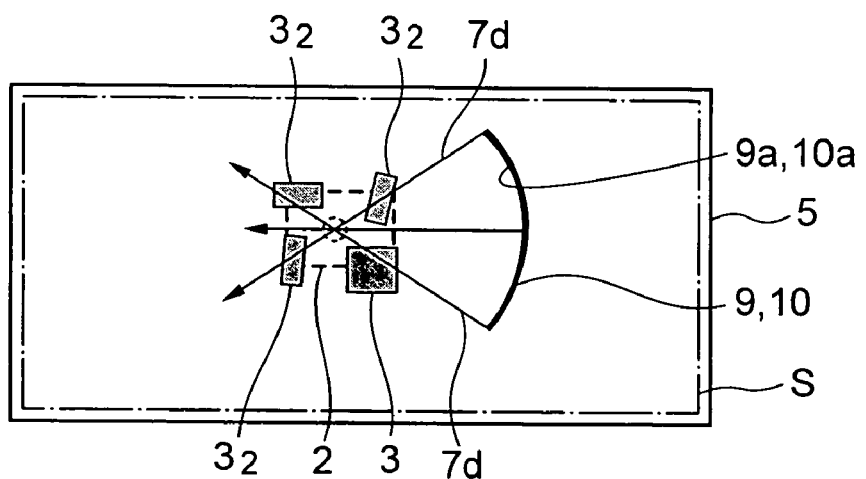
FIG. 18 is an illustration for showing a reflected-wave characteristic according to the embodiment of the present invention.
Figure 19:
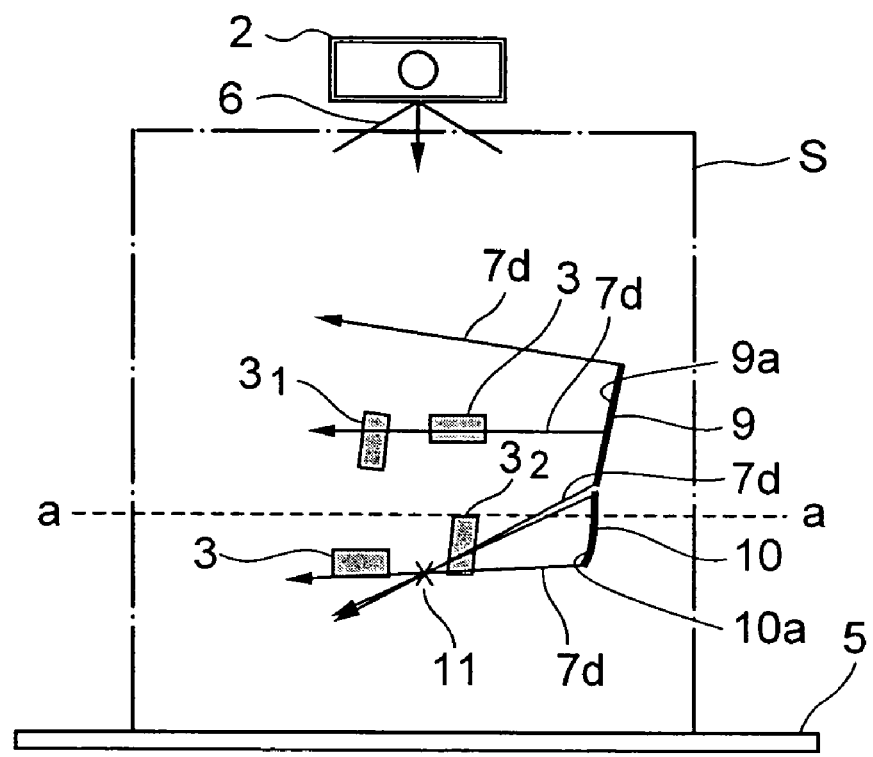
FIG. 19 is an illustration for showing a reflected-wave characteristic according to the embodiment of the present invention.

The reflecting plate 9 according to the third embodiment is arranged in such a posture that the focal point position of the concave cylindrical shape reflecting surface 9a coincides with the center of the traveling direction 6 of the radio wave from the antenna 2 of the reader/writer 1 so that, as shown in FIG. 5 and FIG. 18, the radio waves reflected by the reflecting surface 9a of the reflecting plate 9 can be converged towards the traveling direction 6 of the radio waves irradiated from the antenna 2 of the reader/writer 1. Thus, by moving a platform truck and the like on which a plurality of RFID tags 3 attached to a plurality of commodities are piled up three-dimensionally, the RFID tags 3 are to pass through the area where the electric power of the radio waves is strong. Therefore, reading/writing communication between the reader/writer 1 can be performed by using the higher power radio waves compared to the case of the first embodiment.

Fourth Embodiment

Figure 6:
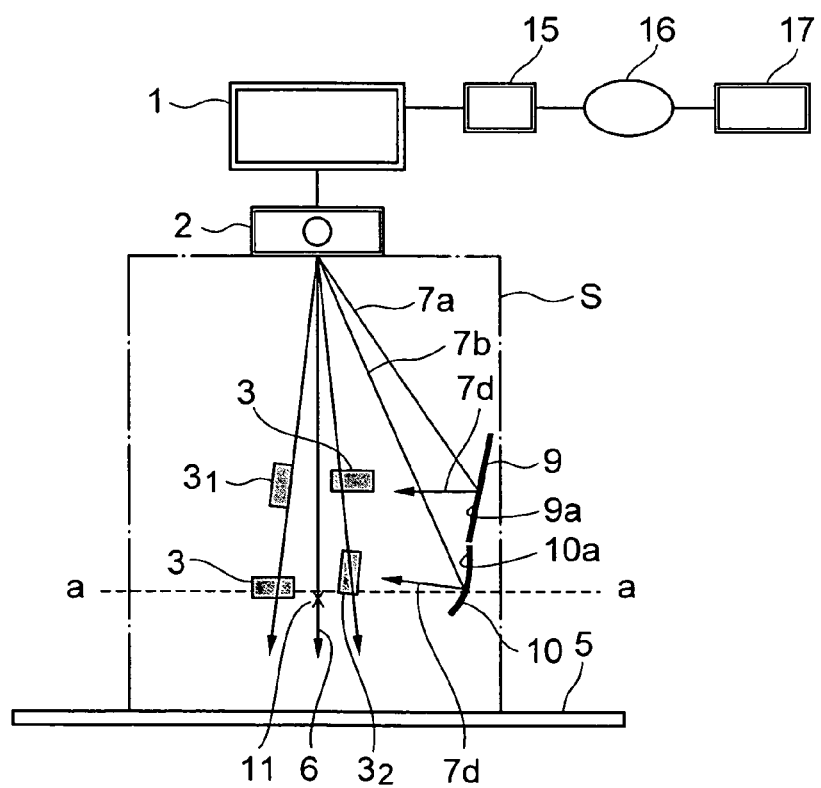
FIG. 6 is a block diagram for showing a radio communication system according to a fourth embodiment of the present invention.
Figure 7:
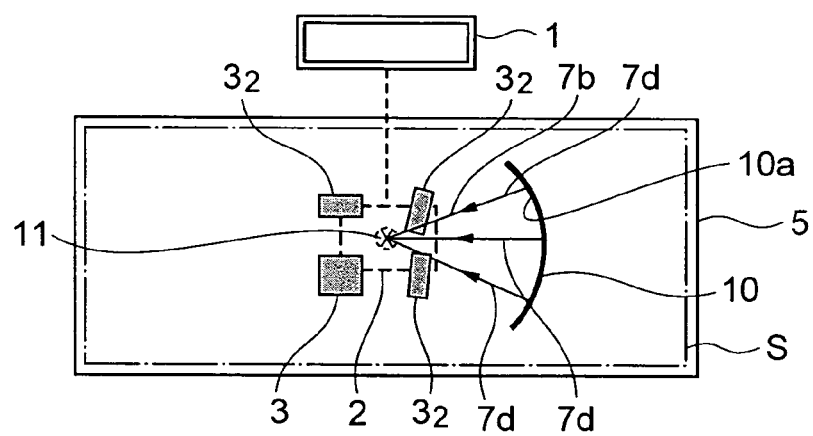
FIG. 7 is a block diagram when viewing an antenna side of a reader/writer from the face taken along the a-a line of FIG. 6.

FIG. 6 and FIG. 7 show a fourth embodiment of the present invention. The fourth embodiment shown in FIG. 6 is a case where the reflecting plate 9 comprising the reflecting surface 9a in a concave cylindrical surface shown in FIG. 5 is used as the reflecting plate of the upper step, and a concave reflecting surface 10a of a reflecting plate 10 in the lower step is modified.

As shown in FIG. 7, when the reflecting plate 10 of the lower step is viewed from the above while the reflecting plate 10 is being placed, the cross section thereof along the length direction (lateral direction) is curved in an arc form. Further, as shown in FIG. 6, when viewed from the side-face side of the reflecting plate 10 while it is being placed, the surface along the traveling direction 6 of the radio waves irradiated from the antenna 2 of the reader/writer 1, i.e. the vertical direction (longitudinal direction) of the reflecting plate 10, is curved in an oval form.

As described above, the reflecting plate 10 according to the fourth embodiment shown in FIG. 6 and FIG. 7, when being placed, has the reflecting surface 10a formed in a concave surface that is curved in both the length direction and the vertical direction that crosses therewith.

In this embodiment, the reflecting plate 9 comprising the reflecting surface 9a formed in a cylindrical surface in the horizontal direction is so arranged that the center of the arc of the reflecting surface 9a coincides with the center of the traveling direction 6 of the radio wave from the antenna 2 of the reader/writer 1. Further, the reflecting plate 10 is disposed in the following manner. Out of the two focal points of the oval in the perpendicular direction of the reflecting surface 10a, one focal point is positioned to meet the center of the traveling direction 6 of the radio wave irradiated from the antenna 2 of the reader/writer 1, while the other focal point is arranged at a position that meets the center of the traveling direction 6 of the radio wave irradiated from the antenna 2 of the reader/writer 1, which is a height position 11 that is roughly equal to the height of the RFID tag 3 positioned at the lowest position among the plurality of RFID tags 3 that are piled up three-dimensionally.

In the fourth embodiment, for the reflecting surface 9a of the reflecting plate 9, the surface in the perpendicular direction is a plane and the surface in the horizontal direction is in an arc form. Meanwhile, the cross section of the reflecting plate 10 along the horizontal direction is curved in an arc form and the surface along the perpendicular direction is curved in an oval form. Thus, as shown in FIG. 7 and FIG. 18, the reflected waves 7d reflected by the reflecting surfaces 9a, 10a are converged towards the center of the traveling direction 6 of the radio wave irradiated from the antenna 2 of the reader/writer 1. Therefore, the electric power of the radio wave becomes stronger towards the center of the radio-wave traveling direction 6.

Thus, in the case of this embodiment, by moving a platform truck and the like on which a plurality of RFID tags 3 attached to a plurality of commodities are piled up three-dimensionally, the RFID tags 3 are to pass through the area where the electric power of the radio waves is strong. Therefore, reading/writing communication between the reader/writer 1 can be performed by using the higher power radio waves compared to the case of the first embodiment.

Furthermore, the reflective plate 10 is arranged in such a manner that one focal point out of the two focal points of the oval in the perpendicular direction of the reflecting surface 10a is positioned to meet the center of the traveling direction 6 of the radio wave irradiated from the antenna 2 of the reader/writer 1, while the other focal point is arranged at a position that meets the center of the traveling direction 6 of the radio wave irradiated from the antenna 2 of the reader/writer 1, which is the height position 11 that reflects the radio wave to the RFID tag 3 positioned at the lowest position among the plurality of RFID tags 3 that are piled up three-dimensionally. Therefore, the radio waves reflected by the reflecting surfaces 9a, 10a of the upper and lower reflecting plates 9, 10 reach to the RFID tag 3 positioned on the lowest step, so that reading/writing communication between the reader/writer 1 can be performed by using the high power radio waves. Moreover, with the combination of these reflecting plates, the radio waves can reach to the RFID tag 3 in the lowest position of the pile. Thus, it is possible to cover the entire area of the plurality of RFID tags 3 that are piled up three-dimensionally.

Fifth Embodiment

Figure 8:
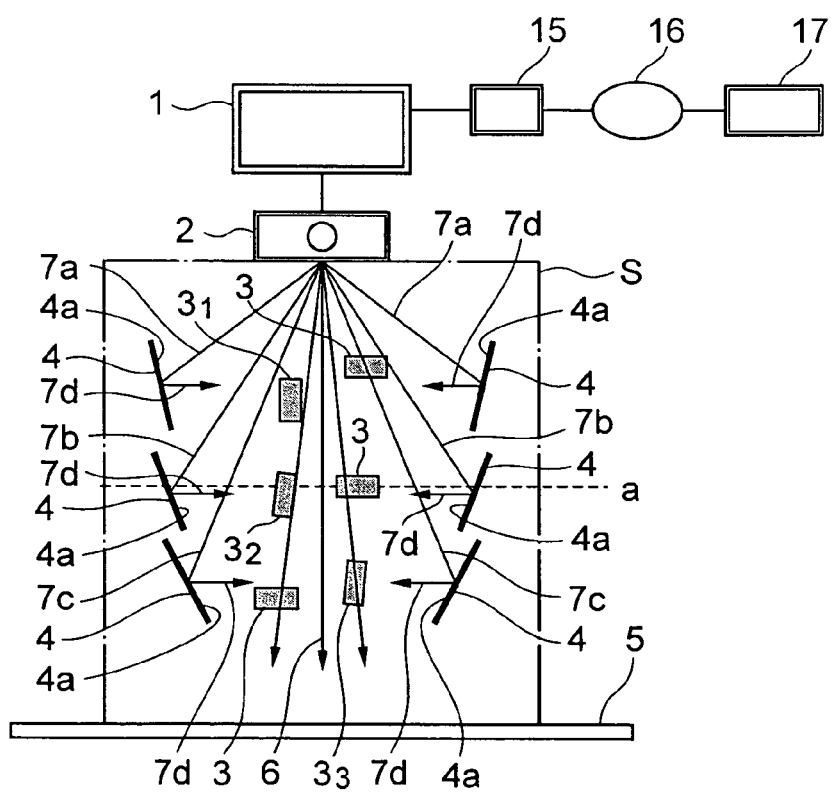
FIG. 8 is a block diagram for showing a radio communication system according to a fifth embodiment of the present invention.
Figure 9:
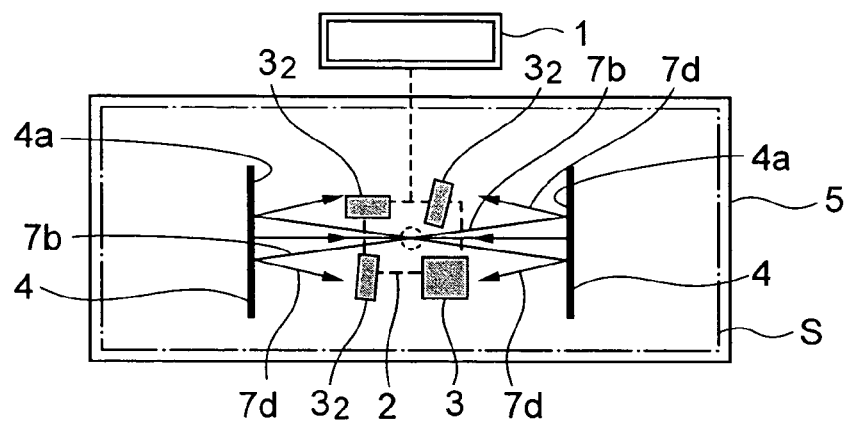
FIG. 9 is a block diagram when viewing an antenna side of a reader/writer from the face taken along the a-a line of FIG. 8.

FIG. 8 and FIG. 9 show a fifth embodiment of the present invention. The embodiment shown in FIG. 8 and FIG. 9 is built by using at least two pairs of the reflecting plates shown in FIG. 1 and FIG. 2. That is, the reflecting plates 4 as a pair in the vertical direction (longitudinal direction) are arranged by sandwiching the aisle of a store or a production line, for example, and the antenna 2 of the reader/writer 1 is disposed facedown at the ceiling of the aisle or the production line partitioned by the pair of reflecting plates 4.

The reflecting plates 4 according to the fifth embodiment reflect, in the horizontal direction or the directions slightly shifted from the horizontal direction, the radio waves irradiated from the antenna 2 of the reader/writer 1 towards the RFID tags 3 being attached to the commodities that are mounted on a platform truck and moved along the aisle of the store or the production line. Therefore, the radio waves from the antenna 2 of the reader/writer 1 can be directly irradiated from the above to the plurality of the RFID tags 3 piled up three-dimensionally, and the radio waves can be irradiated from the horizontal direction by the reflecting plates 4. Moreover, since the pair of reflecting plates 4 are arranged on both sides by sandwiching the aisle or the production line, the direct radio waves outputted from the antenna 2 of the reader/writer 1 and the radio waves reflected by the reflecting plates 4 can be reached to most part of the area within the space S where the plurality of the RFID tags 3 are piled up and accumulated. Therefore, highly reliable communication can be performed between the RFID tags 3, which are mounted on the platform truck and moved along the aisle of the store or the production line.

Sixth Embodiment

Figure 10:
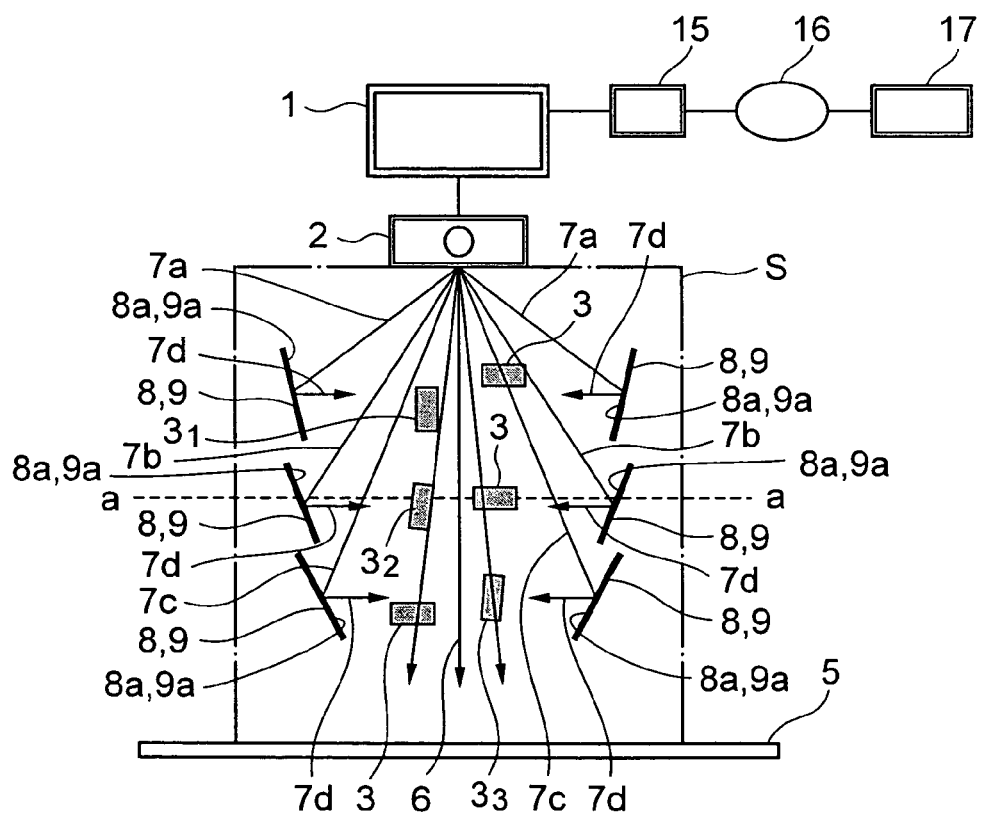
FIG. 10 is a block diagram for showing a radio communication system according to a sixth embodiment of the present invention.
Figure 11:
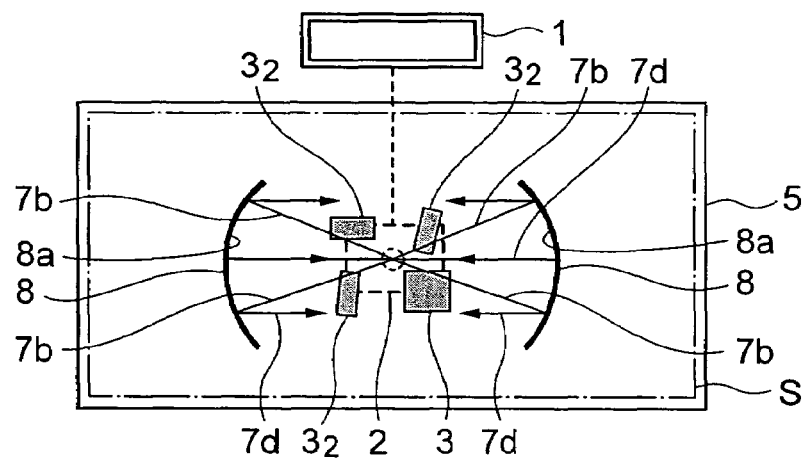
FIG. 11 is a block diagram when viewing an antenna side of a reader/writer from the face taken along the a-a line of FIG. 10.

FIG. 10 and FIG. 11 show a sixth embodiment of the present invention. The embodiment shown in FIG. 10 and FIG. 11 illustrates the case where the reflecting plates 4 of the fifth embodiment are replaced with the reflecting plates 8 of the secondary parabolic cylindrical surface shown in FIG. 4.

By using the reflecting plates 8 shown in FIG. 4 as the reflecting plates as in FIG. 11, it is possible to reflect the radio waves irradiated from the antenna 2 of the reader/writer 1 towards the space S positioned in the aisle of the store or on the production line, and to direct the radio waves to travel in parallel.

Seventh Embodiment

Figure 12:
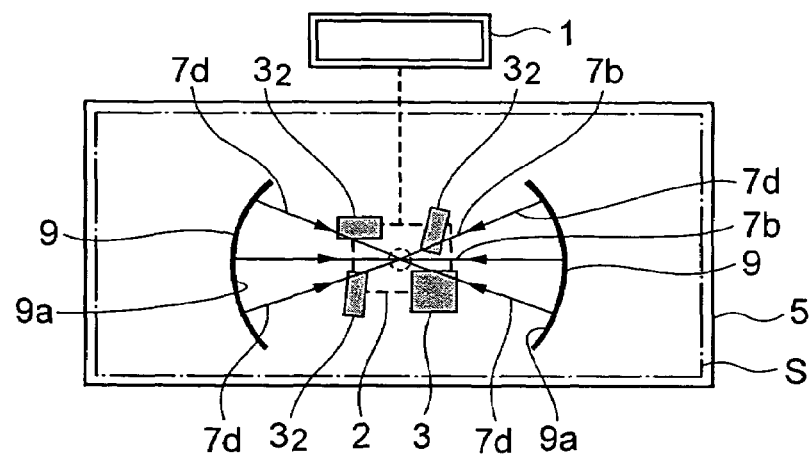
FIG. 12 is a block diagram for showing a radio communication system according to a seventh embodiment, when viewing an antenna side of a reader/writer from the face taken along the a-a line of FIG. 10.

FIG. 12 shows a seventh embodiment of the present invention. The embodiment shown in FIG. 12 illustrates the case where the reflecting plates 4 of the fifth embodiment are replaced with the reflecting plates 9 of the cylindrical surface shown in FIG. 7.

By using the reflecting plates 9 shown in FIG. 7 as the reflecting plates as in FIG. 12, it is possible to reflect the radio waves irradiated from the antenna 2 of the reader/writer 1 towards the space S positioned in the aisle of the store or on the production line, and to direct the radio waves to travel in a convergent manner.

Eighth Embodiment

Figure 13:
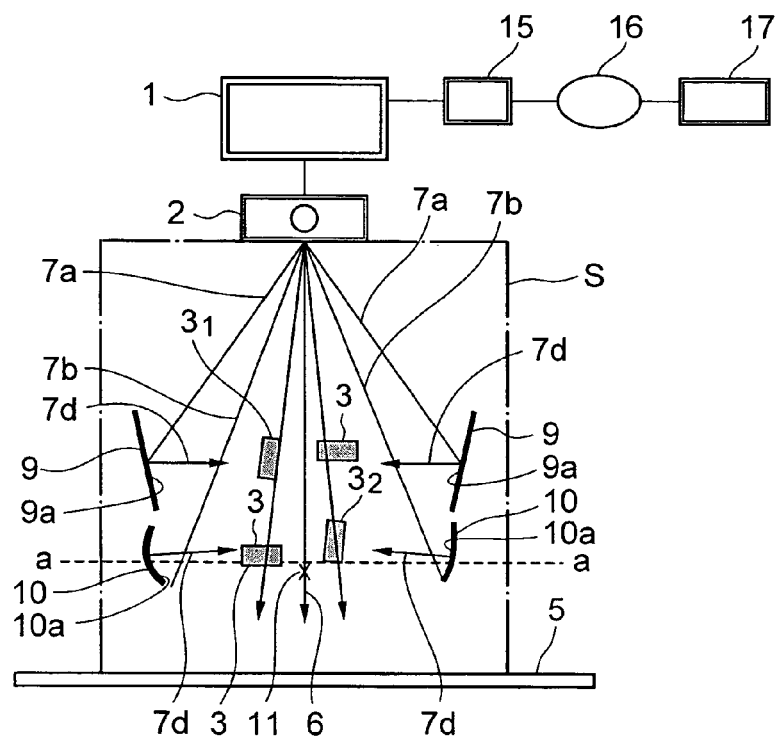
FIG. 13 is a block diagram for showing a radio communication system according to an eighth embodiment of the present invention.
Figure 14:
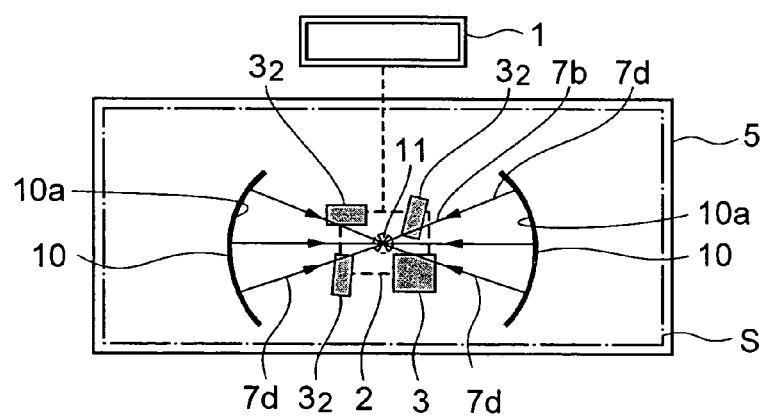
FIG. 14 is a block diagram when viewing an antenna side of a reader/writer from the face taken along the a-a line of FIG. 13.

FIG. 13 and FIG. 14 show an eighth embodiment of the present invention. The embodiment shown in FIG. 13 illustrates the case where the reflecting plates 4 of the fifth embodiment are replaced with the reflecting plates 9 and 10 shown in FIG. 6. With this configuration, it is possible to perform highly reliable communication within the space S where the plurality of RFID tags 3 are accumulated in the aisle of the store or on the production line.

The aforementioned embodiments have been described by referring to the case with the concave-shape reflecting surface, however, it is not intended to be limited to that shape. That is, the reflecting surface may be formed as a secondary parabolic cylindrical surface, a cylindrical surface, or an oval shape, which projects in a convex shape. Further, although widely-used RFID tags are used as the radio IC tags 3 herein, it is not intended to be limited to those RFID tags. Any kinds of radio IC chips may be used as long as they are used by being attached to the commodities and capable of identifying the commodities based on the electronic information. Furthermore, although the widely-used reader/writer is used as the radio transmitter, it is not intended to be limited to this. Any types can be used as long as they are provided with a radio transmitting/receiving function that can exchange information between the radio IC chips by radio waves.

In the embodiments, the space S where a plurality of radio IC tags attached to the commodities are accumulated is set as the warehouse of a store and a factory, or a platform truck and the like moved along the aisle of the store or on a production line. However, it is not intended to be limited to those. The space S may be set at places such as a convenience store, a station kiosk, a movie theater and the like. The place for setting the space S may be anywhere as long as it is the place capable of performing highly reliable communication between the radio IC tags and the radio transmitting/receiving device. Furthermore, the radio IC chips are used to identify the commodities herein, however, the use thereof is not limited to identify the commodities only. The radio IC chip may be mounted to a device carried by a user and used for identifying the user. That is, the target to be identified is not specifically limited.

The structure for attaching the reflecting plates is not described in detail in the embodiments. The reflecting plates may simply be attached to walls of the warehouse or by using metal fittings, and the structure for attaching the reflecting plates is not specifically limited. Furthermore, although the reflecting plates are used herein as the radio-wave directive units, it is not intended to be limited to using the reflecting plates. The radio-wave reflecting effect may be provided to the walls themselves of the warehouse and the aisle, etc.

With the present invention as described above, the radio waves from the reader/writer can be reflected towards the RFID tags by using the reflecting plate, and highly reliable communication between the RFID tags can be achieved by using the radio waves directly irradiated from the reader/writer and the radio waves reflected by the reflecting plate.

What is claimed is:

1. A radio communication system, comprising:
   a radio IC chip used for identification;
   a transmitting/receiving device for performing transmission and reception of information between the radio IC chip by a radio wave; and
   a radio-wave directive unit provided in a space where a plurality of the radio IC chips are accumulated, wherein
   the radio-wave directive unit directs traveling direction of the radio wave irradiated from the transmitting/receiving device towards the radio IC chips,
   wherein the radio-wave directive unit directs the radio wave from the transmitting/receiving device to travel in three-dimensional directions within the space,
   wherein the radio-wave directive unit directs the radio wave from the transmitting/receiving device towards the space by reflection,
   wherein the radio-wave directive unit is constituted with a plurality of reflecting plates having reflecting surfaces for reflecting the radio wave,
   wherein the plurality of reflecting plates are arranged at positions surrounding the space, and
   wherein the plurality of reflecting plates are arranged at different inclination angles with respect to the radio-wave directive unit, based on a distance from each of the plurality of reflecting plates to the radio-wave directive unit.

2. The radio communication system as claimed in claim 1, wherein the plurality of reflecting plates are a combination of reflecting plates with the reflecting surfaces formed as planes.

3. The radio communication system as claimed in claim 1, wherein the plurality of reflecting plates are a combination of reflecting plates with the reflecting surfaces formed as concave surfaces.

4. The radio communication system as claimed in claim 1, wherein the plurality of reflecting plates are a combination of reflecting plates having a different reflecting surface from each other.

5. The radio communication system as claimed in claim 1, wherein the radio IC chip is an RFID tag for identifying an object.

6. The radio communication system as claimed in claim 1, wherein the transmitting/receiving device is a reader/writer for managing the RFID tag as the radio IC chip.

7. The radio communication system as claimed in claim 1, wherein the transmitting/receiving device is disposed above the plurality of reflecting plates and directs radio waves downwards towards the plurality of reflecting plates.

8. A radio communication system, comprising:
   a radio IC chip used for identification;
   a transmitting/receiving device for performing transmission and reception of information between the radio IC chip by a radio wave; and
   a radio-wave directive unit provided in a space where a plurality of the radio IC chips are accumulated, wherein
   the radio-wave directive unit directs traveling direction of the radio wave irradiated from the transmitting/receiving device towards the radio IC chips, wherein the radio-wave directive unit directs the radio wave from the transmitting/receiving device to travel in three-dimensional directions within the space, wherein the radio-wave directive unit directs the radio wave from the transmitting/receiving device towards the space by reflection, and wherein the plurality of reflecting plates are a combination of reflecting plates with the reflecting surfaces formed as convex surfaces.

* * * * *